United States Patent [19]

Moberg

[11] Patent Number: 4,955,576
[45] Date of Patent: Sep. 11, 1990

[54] VERSATILE WRITING BOARD

[76] Inventor: Michael K. Moberg, 584 S. 1st St., Carrington, N. Dak. 58421

[21] Appl. No.: 517,498

[22] Filed: May 1, 1990

Related U.S. Application Data

[63] Continuation of Ser. No. 375,184, Jun. 30, 1989, abandoned, which is a continuation-in-part of Ser. No. 216,366, Jul. 7, 1988, abandoned, which is a continuation-in-part of Ser. No. 483,774, Apr. 11, 1983, abandoned.

[51] Int. Cl.$^5$ .............................................. A47B 19/00
[52] U.S. Cl. .................................. 248/449; 248/231.8; 248/452
[58] Field of Search ................... 248/447.1, 447.2, 453, 248/451, 449, 452, 231.8, 441.1; 108/44; 312/233

Primary Examiner—David M. Purol
Attorney, Agent, or Firm—Robert C. Baker

[57] ABSTRACT

A portable writing board mountable for use on a steering wheel of a vehicle and also entirely stable for writing use when rested upon any flat surface. The board has a platform member which has substantially parallel side edges, a lower edge, and a curved upper edge approximating the curvature of the outer diameter of a vehicle steering wheel. A retaining collar depends from the curved upper edge and is unified thereto. The retaining collar consists essentially of a depending skirt portion and a flange-like portion directed radially inwardly from the skirt portion to thereby form a recess capable of accommodating the rim of a vehicle steering wheel. The most depending portions of the retaining collar form a bottom surface which extends continuously along the entire curvature of the retaining collar, and lies in an imaginary plane intersecting the platform at an axis line perpendicular to the side edges of the platform and located at the lowermost bottom edge of the platform. A shelf is provided and may be adjusted along guide ridges at side edges of the platform. A clip member is provided for holding papers on the platform member.

46 Claims, 5 Drawing Sheets

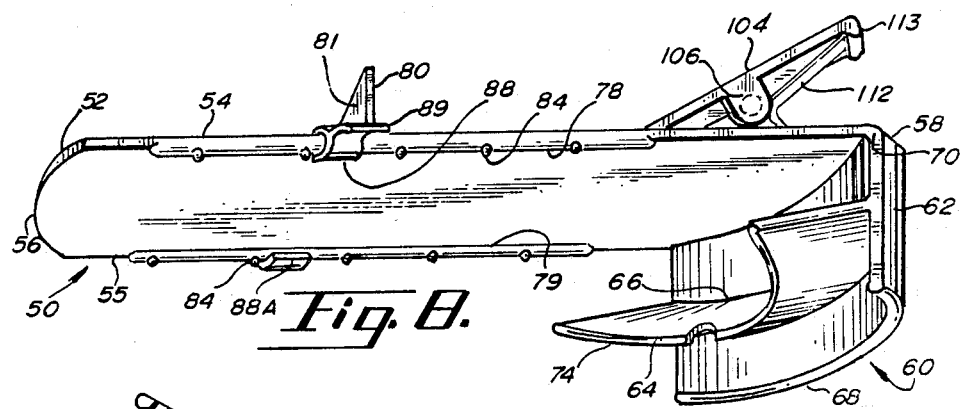
Fig. 8.
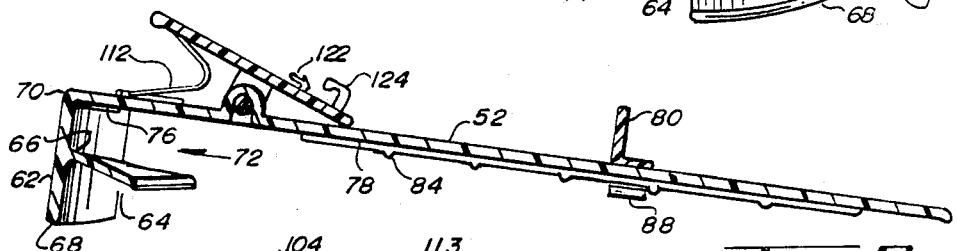
Fig. 9.
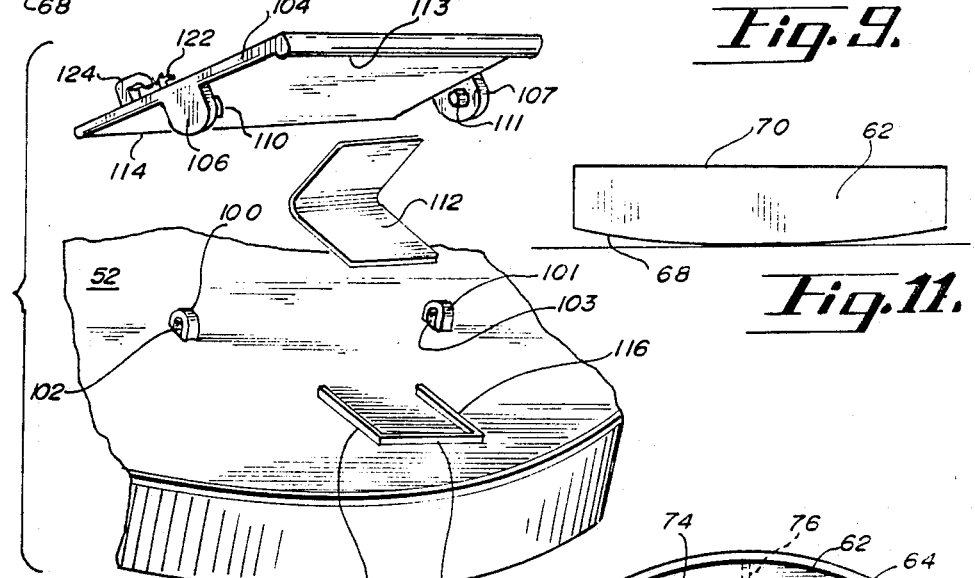
Fig. 13.
Fig. 11.
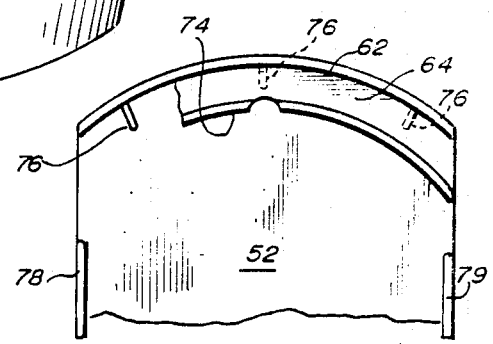
Fig. 10.

VERSATILE WRITING BOARD

CROSS-REFERENCE TO RELATED APPLICATION

This is a continuation of application Ser. No. 07/375,184, filed Jun. 30, 1989 now abandoned, which was a continuation-in-part of application Ser. No. 07/216,366 filed July 7, 1988 now abandoned, which was a continuation-in-part of application Ser. No. 06/483,774, filed Apr. 11, 1983 now abandoned.

BACKGROUND OF THE INVENTION

This invention relates to a portable writing board mountable for use on a steering wheel of a vehicle and also useful in other environments apart from a steering wheel. The most preferred embodiments have a special feature to make the writing board entirely stable for writing use when rested upon any flat surface. The invention also relates to the writing board in various combinations with other structures such as a shelf, a clip, and also the steering wheel of a vehicle.

All heretofore known portable writing boards for the steering wheels of vehicles have suffered from instability and a tendency to scratch when one has attempted use of them as a writing board on a substantially flat surface apart from a steering wheel. The under surface of those heretofore known has frequently been equipped with spaced and centered projecting elements useful in the mounting of the writing board to a vehicle steering wheel but highly objectionable when employing the board in any other environment.

Additionally, the mounting techniques heretofore employed for holding the writing board on a steering wheel have been relatively complex with none approaching the utter simplicity of the unitary collar structure of this invention and its performance features Insofar as is known, no one has ever heretofore provided a continuous collar structure of gripping or pinching character for steering wheel mounting. Further, insofar as known, no one has provided a collar structure of such character and additionally having features or elements of sufficient rigidity and design for stable support of the writing board on a flat surface.

An important aspect of the most preferred embodiments of my invention is the ability of a single size writing board to accommodate a variety of vehicle steering wheel diameters and rim thicknesses. The diameter of vehicle steering wheels varies considerably. The thickness of the steering wheel rim generally increases as the diameter decreases, and the rim thickness decreases as the diameter increases. The prior art writing boards generally must be tailored to fit specific different sizes of steering wheels, and any one single form of manufacture for them is not centerable on all sizes of steering wheels. My most preferred writing board, however, centers well on a variety of steering wheels because of the placement of different rim thicknesses within the tapering recess of the compound collar of the board. A larger diameter wheel with a small rim thickness fits deep into the recess in a pinched manner. Therefore, the lower edge of the platform member will usually be located close to the diametrically opposite portion of the steering wheel rim, causing the platform member to be relatively centered over a larger diameter steering wheel. However, a smaller diameter wheel with a large rim wheel with a large rim thickness does not fit very deeply into the tapering recess, but still is pinched by it, thus causing the upper curved edge of the platform member to extend out from the steering wheel rim, with the result that the overall extent of the platform member is relatively centered over a smaller diameter steering wheel.

SUMMARY OF THE INVENTION

The writing board of this invention is designed for multi-purpose use, not just on the steering wheel of a vehicle. It is quickly attachable to and detachable from the steering wheel of a vehicle by using one hand. This permits the user to avoid wasted time and effort in seeking proper adjustments in the placement of the writing board on the steering wheel and also allows the user quick portability and use of the writing board in a multitude of environments without risk of scratching or damaging surfaces on which the writing board may be placed temporarily to accomplish any task.

An important feature of my writing board is its curved upper edge and associated retaining collar. A flange-like portion of the retaining collar is another feature allowing for versatility of use and standardization of manufacture without the necessity of designing the writing board to fit a particular diameter or thickness of steering wheel. In effect, this special structure for my writing board, and particularly the retaining collar portion of it, allows mounting of my writing board on steering wheels of smaller as well as larger diameter than the curved upper edge of my writing board. Further, the collar mounting of my most preferred boards can be accomplished firmly by pinching at different locations about the circumference of a steering wheel. In all instances of steering wheel mounting, my collar structure serves to offset dislodgement from the steering wheel as may be occasioned by the application of downward pressures in writing; and this is accomplished with extraordinary simplicity of design as compared to anything heretofore known.

When used on a flat surface or a substantially flat surface, even on a hood of a car, the tapered character of the preferred bottommost surface of my collar structure provides continuous contact for stable support of the entire extent of the upper curved edge of my writing board for writing use, without danger of scratching or denting the underlying support surface. My preferred writing boards when placed on a flat surface provide a stable inclined plane for writing without the problem of tilting as left and right motions take place in writing.

Major features for all of my writing boards are: the platform member has substantially parallel side edges, a lower edge, and a curved upper edge which approximates the curvature of the outer diameter of a vehicle steering wheel but need not conform thereto. A retaining collar depends downwardly from the curved upper edge of the platform member and is unified thereto. The retaining collar consists essentially of a depending skirt portion and a flange-like portion directed radially inward from the skirt portion to thereby form a recess for accommodation of the rim of a vehicle steering wheel. The most preferred retaining collar is further characterized by the fact that its most depending portions form a bottom surface which extends continuously along the entire retaining collar.

In the most preferred embodiments, the most depending portion of the retaining collar is the bottom edge of the skirt portion. Additionally, and most preferred, is the fact that the bottom-most surface of the retaining collar (whether the skirt or the flange-like part) lies in an imaginary plane which intersects the platform of the writing board at an axis line perpendicular to the side edges of the platform and located at the lowermost bottom edge of the platform, whereby the bottom surface of the retaining collar provides continuous contact for underlying stable support of the entire curved upper edge of my writing board when it is used on a flat surface.

My most improved embodiments for the writing board have the flange-like portion of the collar united to the skirt portion along an arc located on the wheel side of the skirt portion. The wheel side of the skirt portion is the side facing inwardly underneath the platform, whereas the exterior side faces away from the platform. The arc where the flange joins the skirt portion is intermediate between the lower or most depending edge of the skirt and the junction of the skirt to the upper curved edge of the platform member. The flange-like portion is united to the skirt portion at a non-normal angle so as to form a tapering recess for receiving the rim of a steering wheel. The recess gradually tapers or narrows as deeper penetration into the recess occurs so that a variety of steering wheel rim thicknesses may be snugly accommodated in the recess. Shim-like members or bulges in the recess aid in forming a snug fit for smaller thicknesses of steering wheel rims.

The board will usually also have a clip member for holding paper on it, card holding devices, pen holding means, and preferably will have a shelf assembly mounted on the platform by means cooperative with elements under lateral sides of the platform member.

Writing boards of the invention are formed preferably out of organic plastics material and preferably molded as a unitary structure At least the platform member and collar are a unified structure.

Especially useful writing boards of the invention are not only formed in a unified manner but also possess sufficient elasticity or yieldability in the flange-like portion of the collar structure to allow a slight spread or distension of the collar structure for a tight fit or clamping or gripping or pinching effect on a steering wheel.

Many other advantages and benefits of the invention will become evident as this description proceeds.

BRIEF DESCRIPTION OF THE DRAWING

FIG. 8 is a schematic perspective view of my most preferred board, the view being at a slight angle to show structures on the underside of the platform member as well as an adjustable shelf assembly;

FIG. 9 is a schematic cross section through the board of FIG. 8, taken along a vertical plane bisecting the right and left halves of the board and showing the right half of the board;

FIG. 10 is a plan view of the underside of the upper portion of the board of FIG. 8, with parts broken away, and illustrates the curvature of the collar skirt portion, the flange-like portion, and a shim-like member united to the bottom surface of the platform within the recess formed by the retaining collar;

FIG. 11 is a schematic end view of the board of FIG. 8 and shows the skirt position in a resting position upon a flat surface;

FIG. 13 is an exploded perspective view of the clip member details for the board of FIG. 8;

DESCRIPTION OF THE PREFERRED EMBODIMENTS

Figure 1:
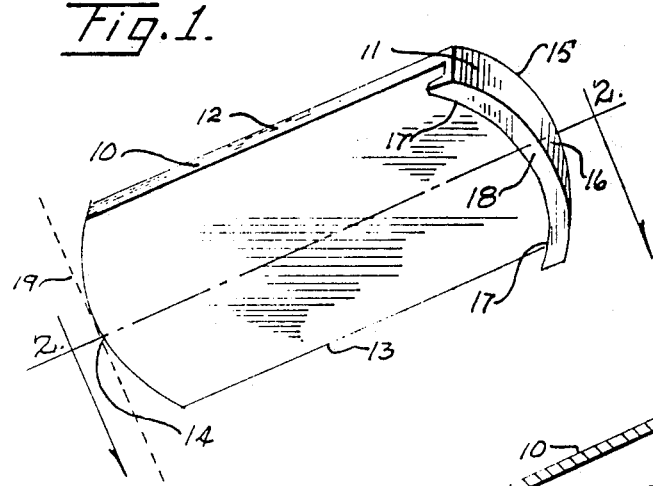
FIG. 1 is a schematic perspective view showing the under side of one basic writing board of the invention.
Figure 2:
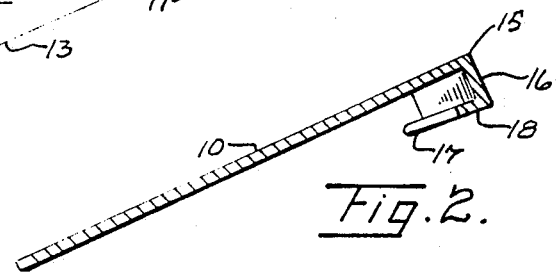
FIG. 2 is a cross-sectional view of FIG. 1 taken at line 2—2 of FIG. 1.

Referring to FIGS. 1 and 2, the writing board has a platform member 10 which in this embodiment presents a flat upper surface for writing (not shown) and a flat underside surface except for the collar structure 11. This platform member has substantially parallel side edges 12 and 13, a lower edge 14 which in this instance is curved, and a curved upper edge 15. The curvature of the upper edge suitably approximates the curvature of the outer diameter of a vehicle steering wheel, but that radius of curvature for the upper edge suitably may be more or less than the outer diameter curvature of a steering wheel without detracting from the utility of the writing board.

The retaining collar 11 depends downwardly from the curved upper edge 15 and is unified thereto. The collar structure has a depending portion which suitably may be characterized as a skirt section or portion 16 and a flange-like portion 17 which is directed radially inwardly from the bottom edge of the skirt portion. In this manner a recess is formed for accommodating the rim of a vehicle steering wheel. It does not matter that the vehicle steering wheel may have an outer diameter smaller than or greater than the inner diameter of the recess. In either event, the flange-like portion or backing plate part of the collar structure will hold the writing board on the steering wheel when the writing board is temporarily placed thereon by a salesman or the like;

and nevertheless, the writing board is quickly removed from the steering wheel with one hand and then readily placed upon flat surface without danger of scratching the surface and is immediately useful for any further writing.

The nature of the depending collar structure is especially important. The most depending portions preferably form a bottom surface which extends continuously along the entire curvature of the retaining collar. This bottom surface is tapered from the center point 18 of the curvature to the terminus or ends (both marked 17) on each side of the writing board. A more accurate way of putting that point is as follows: the bottom surface lies in an imaginary plane which intersects the platform at an axis line 19 perpendicular to the side edges of the platform. The axis line of intersection is located at the lowermost bottom edge of the platform. In this manner, the bottom surface of the collar structure provides continuous contact or flush contact to a flat surface and thus provides an underlying stable support of the entire upper edge of the writing board (and in effect stability for the entire board) when it is used on a flat surface.

Figure 3:
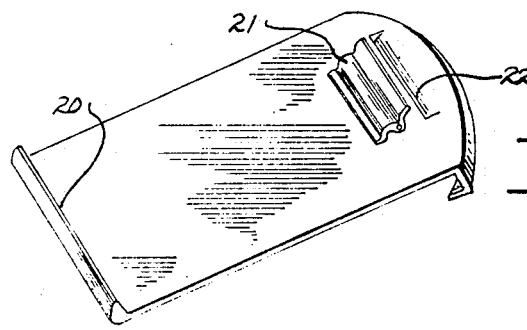
FIG. 3 is a schematic perspective view of the upper surface of a writing board of the invention incorporating optional elements.

The writing board of FIG. 3 is comparable to that illustrated in FIG. 1 except that the lower edge instead of being curved as preferred is provided with a straight edge perpendicular to the side edges of the platform and equipped with an upstanding ledge 20 which is optional. Other optional features illustrated in FIG. 3 are one or more clip members 21 for holding papers on the upper surface of the platform, which upper surface forms a flat writing surface, plus one or more grooves 22 or depressions or slots (which may vary in size) into the upper surface of the platform and located near the upper edge thereof for receiving or holding physical objects such as a writing instrument, or a plastic card such as a driver's license or credit card, or even a thin calculator.

Figure 4:
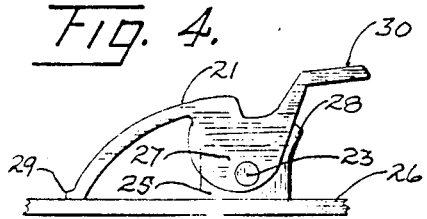
FIG. 4 is a schematic end view of one form of clip structure of the invention.
Figure 5:
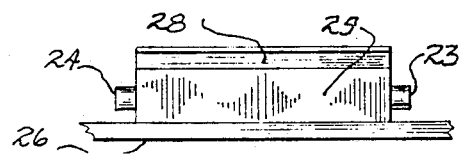
FIG. 5 is a schematic side view of one form of mounting base for a clip.

In FIG. 4, there is illustrated a novel design for a clip member 21 such as schematically illustrated also in FIG. 3. Illustratively, the clip member may be formed entirely of organic plastics material, as indeed the entire writing board preferably is. FIGS. 4 and 5 should be referred to for a complete understanding of the clip and its mounting. The mounting posts for the clip member 21 may consist of stub shafts 23, 24 molded unitarily as part of a base structure which itself is molded unitarily upon the platform member 26. The clip member itself suitably is provided with ear-like flanged elements 27 at each end. Each such element carries a bore which snaps in position on the stub shafts 23, 24. Deformable but resilient plastic, in the form of a strip 28, may be employed as the spring means to maintain the clip member normally in a clamping or clipping condition (e.g., note the showing in FIG. 4 where the strip or band 28 extending upward from the base 25 is distended backward and puts pressure on the clip to hold it in clipping position). The arrangement allows opening or elevation of the clip edge by depression of the thumb element 30 against the resilient plastic 28. If desired, the stub shafts for mounting the clip member may be incorporated as part of the clip member per se at the location of the bores in the flange-like ears of the clip member; and in that event, the base mounting structure 25 unified with the platform should be equipped with recesses instead of the outwardly projecting stub shafts illustrated. Optionally, other forms of plastic clip and spring structures may be employed, or even metal springs and clips, if desired, preferably keeping all edges smooth and free of scratching tendency.

Figure 6:
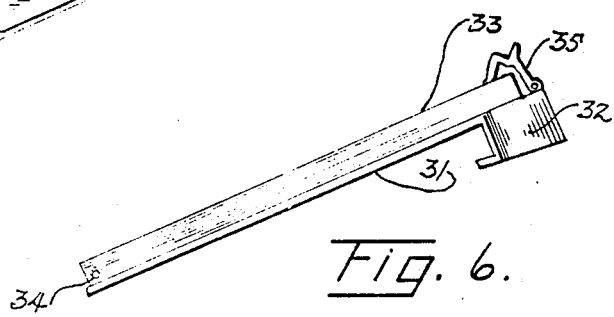
FIG. 6 is a schematic side view of another writing board of the invention, namely one having a storage compartment and a hinged cover which provides the upper flat writing surface.

The writing board illustrated in FIG. 6 incorporates a compartment (not shown) for the storage of writing supplies or papers. The underlying structure of this writing board includes a platform member 31 with the collar 32 aforedescribed as a part thereof. Additionally, the platform member is provided with a low upstanding wall extending within the interior of a cover member 33 which provides the flat writing surface and is hinged for pivotal opening about hinge 34. A clip 35 is schematically illustrated. Clip 35 is suitably of the type aforedescribed. It is contoured to perform the dual function of holding the cover member 33 down upon the platform member 31 as well as for clamping paper upon the top surface of the cover member for writing purposes.

Figure 7:
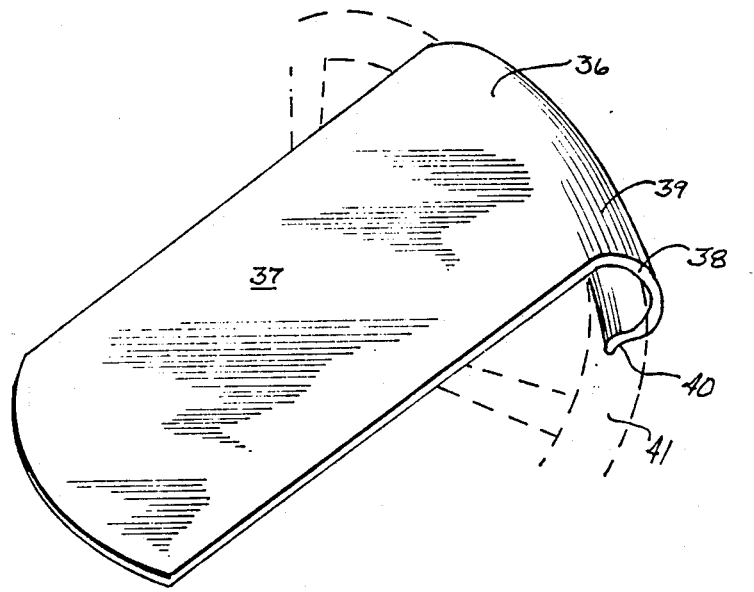
FIG. 7 is a schematic perspective view of a basic writing board of the invention wherein the collar structure is contoured.

The writing board of FIG. 7 is comparable to that illustrated in FIG. 1 except that the very upper edge 36 of the platform member 37, and the entire depending retaining collar structure 38, are gracefully contoured more or less merging the skirt section or portion 39 and the radially inward flange-like portion 40. The result gives a visually attractive and graceful appearance but yet a functional relationship having all the features illustrated in the writing board of FIG. 1 and 2, plus even more advantageous functional features. Ideally, the writing board of FIG. 7 is molded out of organic plastics material. The particular material selected may vary. Where a relatively flexible organic plastics material is employed (such as some forms of polyethylene), the thickness of the platform portion of the structure suitably is increased to cause the platform portion to be relatively rigid and exhibit a stable flat top surface (as shown) for writing. The retaining portion may be relatively decreased in thickness although still relatively thick in the case of employing an organic plastic of relative flexibility. Organic plastics which exhibit greater stiffness even when relatively thin, such as some forms of polystyrene and acrylates such as polymethylmethacrylate, are likewise useful in the formation of the writing board illustrated in FIG. 7. Use of these may permit an even thinner wall at the collar structure with retention of strength and yet realization of distendability feature discussed below.

A key feature of a preferred writing board molded out of plastic in accordance with the showing in FIG. 7 is that of an expandable or distendable retaining collar, that is a retaining collar which can be distended or expanded as it is pressed over a rim of a steering wheel 41, with the result that it effectively clamps the steering wheel 41 or pinches against the under side of the steering wheel, as schematically illustrated in FIG. 7. Even so, the characteristics of the bottommost surface of the flange-like portion 40 which is radially inwardly directed are such that the benefits of tapering from the medial section toward the lateral edges, as discussed for the board of FIGS. 1 and 2, are retained. Here also, the bottom surface along the flange-like portion provides continuous contact with a flat surface when the writing board is employed apart from a steering wheel. In this respect, the retaining collar structure, even when formed of organic plastics material having some distendability or yieldability and elasticity as aforediscussed, is nevertheless sufficiently stiff to perform the support function as described for flat surface use of the writing board.

For purposes of illustration, it should be noted that most automobile steering wheels have a rim which is approximately one inch up to about one and one-fourth inch in thickness. Where an expandable or distendable retaining collar is to be employed as in the case particularly illustrated in FIG. 7, the distance between the inner surface of the flange-like radially inward directed portion of the collar and the opposing under side of the platform member at the collar location should not exceed about one inch and suitably is fractionally less than one inch.

However, where the retaining collar structure employed is such that it has the features noted for FIG. 1 and does not have the expanding capability just discussed for FIG. 7, it is preferable to employ a larger space between the inside surface of the flange-like portion and the opposing under surface of the platform member, say a space on the order of at least one and one-eighth inches or about one and one-fourth inches or slightly more in thickness or width.

The most improved and preferred teachings of the invention will now be discussed with particular reference to FIGS. 8 through 19.

Figure 12:
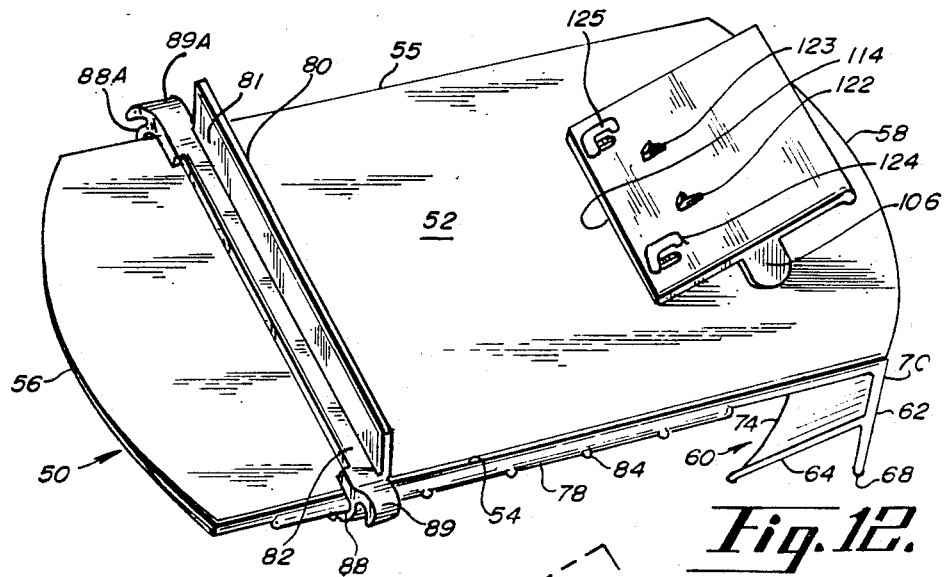
FIG. 12 is a perspective view of the upper surface structure of the board of FIG. 8.

Referring first to FIGS. 8 and 12, the writing board 50 has a flat platform member 52 with substantially parallel side edges 54 and 55, an upper edge 58 curved at approximately the same radius of curvature as a vehicle steering wheel, and a lower edge 56 which may also be curved as shown. Depending from the entire curvature of the curved upper edge 58, and unified thereto, is a retaining collar 60.

The retaining collar 60 is preferably a single continuous unit comprised of a relatively rigid skirt portion or skirt wall 62 and a flange-like portion 64. The skirt 62 depends from the entire curved upper edge 58 of the platform member 52 and preferably forms a right angle with the platform at any given point along the curved upper edge 58. The flange-like portion 64 is preferably less thick and therefore more flexible than the skirt wall 62. The flange-like portion 64 extends radially inward underneath the platform It is united to the wheel side (i.e., the inner side underneath the platform) of the skirt portion 62 along an arc 66 which is spaced intermediate between the lower or most depending or bottom edge 68 of the skirt portion 62 and the junction of the skirt portion 62 to the upper edge 58 of the platform member 52. This arrangement permits the flange-like portion to be relatively thinner than the skirt portion without sacrifice of stability where the board is used on a flat surface. Also the flange-like portion should be yieldingly resilient for preferred steering wheel pinching mounting without sacrifice of stability for the entire board on a flat surface.

Further of significance is the fact that the flange-like portion 64 is united to the skirt portion 62 at a non-normal angle so as to form a tapering recess 72 (see FIG. 9) of gradually diminishing width capable of snugly accommodating a variety of rim thicknesses for a vehicle steering wheel. The angularity of the flange 64 to the skirt wall, when measured within the recess 72, must be at least 95° and preferably at least about 100°. It may sometimes be as great as up to 115° but preferably no more than 110°. Looseness of pinch type clamping usually arises at angularity in excess of about 110°. The most preferred angularity lies within about 102° to about 108° so as to maintain the most versatile and effective use for "biting" or pinching action between the flange and lower surfaces of the platform within the recess 72 when the writing board is mounted on steering wheels of varied sizes. Still further, for gripping or pinching action on larger diameter (and thinner rim steering wheels), a plurality of radially-oriented shim-like members 76 (see FIGS. 9 and 10) may be molded in the plastic on the underside of the platform 52 in the recess area 72. The shim-like members 76 may alternatively be molded on the recess surface of flange 64. The shims 76 aid in forming a snug fit of large diameter but thin rimmed steering wheels between the flange-like portion 64 and the bottom surface of the platform member 52. Preferably the shims 76 are thin and short. They extend radially from the skirt portion but a short distance, generally no more than about two-thirds the radial width of the flange-like portion.

In the most preferred embodiments, the most distal edge 74 of the flange-like portion 64 is such as to not interfere with placement of the most depending edge of the skirt and lower edge of the platform in resting condition on a flat surface. The distal edge may under such conditions actually contact the flat surface, but is preferably at least slightly spaced from the flat surface upon which the board 50 may be rested for writing. The board 50 should rest on and be supported by the most depending edge 68 of the skirt portion 62. When rested upon a flat surface, the edge 68 is preferably in continuous contact with the flat surface; and this is accomplished when the height of the skirt portion 62 (measured between the most depending edge 68 and the upper edge 70) tapers slightly from its greatest height at the middle of the skirt portion to its narrowest at the side edges 54 and 55 of the platform member 52. FIG. 11 is intended to illustrate this point. Stated another way, the edge 68 forms a bottom surface which extends continuously along the entire curvature of the skirt portion 62 in an imaginary plane (as aforediscussed for other embodiments) which intersects the platform member 52 at an axis line perpendicular to the side edges 54 of the platform member 52 at the very lower edge 56 of the platform Also shown in FIG. 8 are longitudinal guide ridges 78 and 79 united along the side edges 54 and 55 of the platform member 52, preferably at the underside of the side edges (as further illustrated in FIG. 12). The guide ridges depend downwardly from the side edges of the platform and function cooperatively for mounting a removable and preferably adjustable shelf assembly 80 laterally across the upper or writing surface of the platform member 52. Optional stop members, such as stops in the nature of stop knobs 84, project downwardly and are spaced along the guide ridges 78. These stops 84 function to aid in holding the clamping-type adjustable shelf 80 shown in FIGS. 8, 9, and 12 in a selected position along the length of the writing board.

The clamping-type removable and adjustable shelf assembly 80 is comprised of a shelf member 81, a shelf support flange 82 united to the shelf, clamping members 88 and 88A, and finger operated projecting clamp release handles 89 and 89A. The shelf member 81 extends laterally across the writing surface of the platform member between the side edges 54 and projects upwardly, preferably perpendicularly, from the writing surface of the board. The support flange 82 is united to the shelf 81 more or less in an angle iron configuration and also extends laterally across and in contact with or fractionally above the writing surface. Clamping members 88 and 88A are at the lateral side edges of the shelf member and are united to the lateral side edges or ends of support flange 82. Each clamping member curves downwardly and inwardly underneath the platform edges for riding in a clamping fashion on the depending guide ridges 78 and 79. The shelf 81 can be slidably adjusted along the length of the board 50 to provide a support for holding various objects on the writing surface at locations convenient to a user. The clamping members 88 may be released or pulled away from the guide ridges by finger lifting of release handles 89 so as to pass the clamp members over stops 84 in adjusting the location of the shelf along the length of the writing board. When finger handles 89 and 89A are released, the position of the shelf 81 is maintained by abutment of clamps 88 and 88A against stops 84. Stops 84 are, of course, oriented as opposing pairs on the guide ridges. Any one pair is equidistant from either end of the board. The entire shelf assembly 80 is unified and preferably formed of yieldable but relatively stiff plastic. Thus the yieldability of the plastic at the configuration of the clamps and finger handle is relied upon for pulling the clamps 88 and 88A away from the guide ridges 78 and 79 to move the shelf assembly over stops 84.

Figure 16:
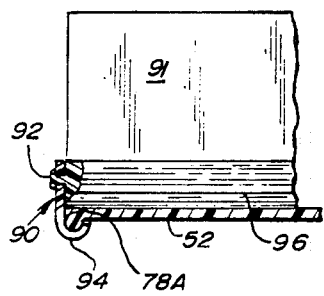
FIG. 16 is a schematic cross section taken on line 16—16 of FIG. 15, with parts broken away, illustrating details for the left edge mounting of the shelf (which details are mirror images of the right edge mounting)
Figure 15:
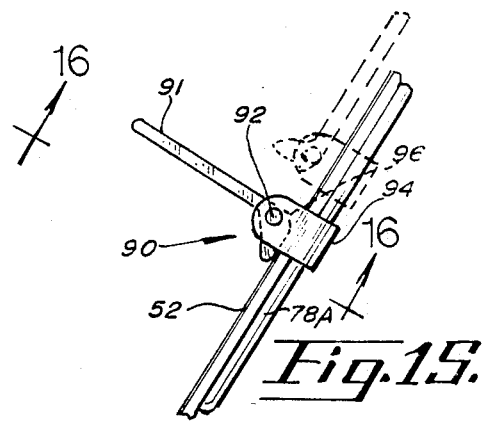
FIG. 15 is a schematic side view of an alternative adjustable shelf for the board of FIG. 8, the view here being one for the right edge of the assembly and having parts omitted or broken away.

FIGS. 15 and 16 illustrate an alternative removable and adjustable shelf assembly suitably characterized as a cam-type adjustable shelf assembly 90. This shelf assembly is releasably cammed against the writing surface of the board 52 by a cam structure 96 united to the bottom edge of the shelf 91 nearest the writing surface. The shelf 91 extends laterally across the writing surface of the platform member between the side edges of that member and extends upwardly, preferably perpendicularly, from the writing surface of the platform member when placed in operating condition. Knobbed spindle members 92 extend out from each lateral side edge of the shelf member 91 and are unified thereto. A bracket 94 comprised of a hook-like end member and an arm having a hole in it is mounted on each knobbed spindle 92, with the spindle extending through the hole of the bracket arm so as to permit relative pivot movement between the bracket 94 and the spindle 92. The bracket is pressed over the knob of the spindle in manufacture, so as to more or less snap it in place. The hook end of bracket 94 embraces a guide ridge 78A on the bottom of the lateral side edges of the platform 52. The guide ridge in this embodiment preferably lacks the knobs 84 of the ridges as shown in other figures. The location of the shelf 91 along the length of the platform 52 can be adjusted by releasing the cam means 96 from the cammed position (by exerting slight hand pressure on the shelf member 91 to pivot it toward the upper curved edge of the platform), and then sliding the shelf 91 up or down the length of the board 50 to the desired position. Dotted lines in FIG. 5 illustrate the shelf 91 in a slidable position. The shelf 91 is then cammed against the writing surface of the platform 52 by slight hand pressure on the shelf member 91 to pivot it toward the lower edge of the platform such that the shelf 90 projects substantially perpendicularly upwards from the writing surface when in the cammed position. The cammed usable position of the shelf 91 is shown by the solid lines in FIG. 15.

Figure 17:
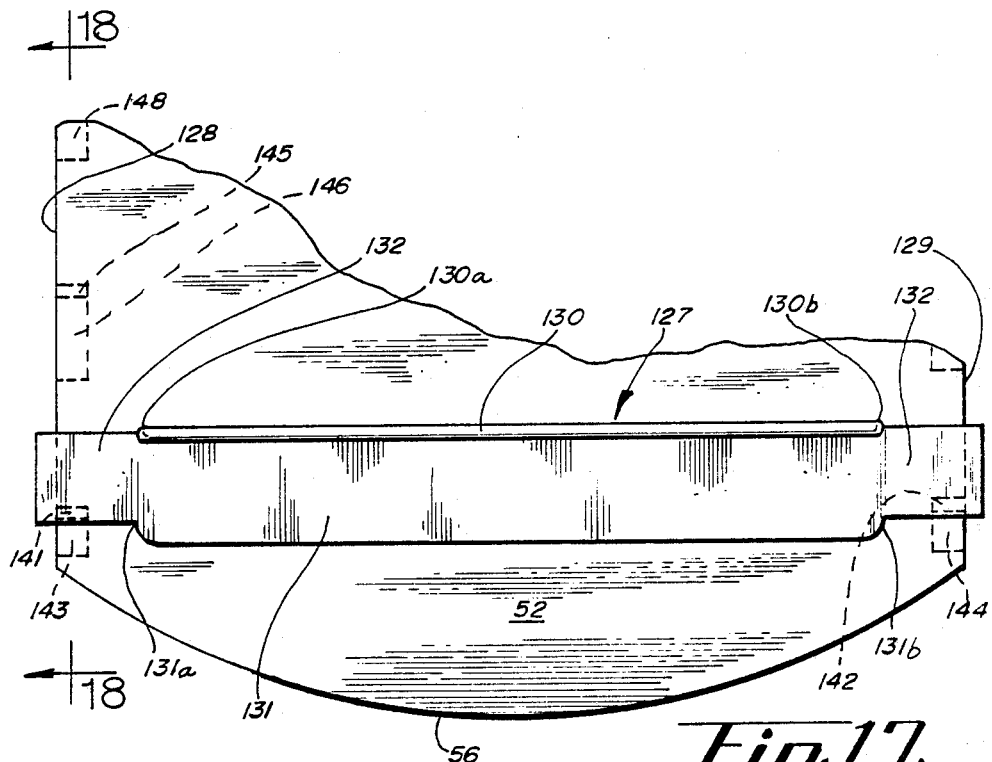
FIG. 17 is a fragmentary schematic plan view of a writing board of the invention (with the upper portion broken away) in combination with an alternative and preferred removable shelf.
Figure 18:
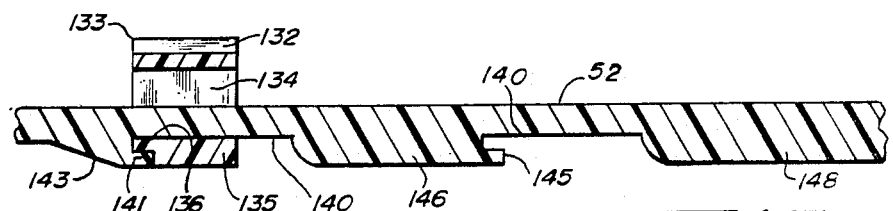
FIG. 18 is a schematic sectional view taken along line 18—18 of FIG. 17.
Figure 19:
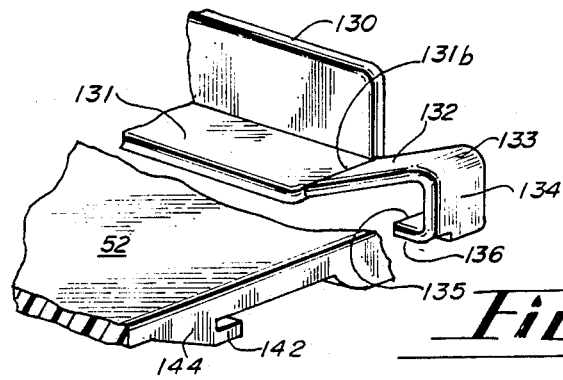
FIG. 19 is an exploded schematic perspective view of lateral of the shelf and writing board of FIGS. 17 and 18, with parts broken away.

FIGS. 17 through 19 illustrate the most preferred removable shelf assembly 127 of the invention. The platform member in these figures is given the same number, namely 52, as employed for the platform member in FIGS. 8 and 12. The lower edge of the platform member is labeled 56. Lateral side edges 128 and 129 of the platform member are parallel. The shelf member 130 extends vertically upward from the upper surface of the platform member and extends laterally between the side edges 128 and 129 of the platform. To be noted is that the lateral terminal ends 130a and 130b of the shelf member 130 do not extend fully to the side edges 128 and 129 of the platform. The lateral ends 130a and 130b terminate at about the lateral points 131a and 131b of the support flange 131. That support flange extends in relatively flush contact with the surface of the platform 152 and is united with the shelf 130 in an angle iron configuration. The lateral ends 131a and 131b of the support flange merge into a clamp structure at each end. Each clamp structure has the same elements. The basic features of each are common at each end. Thus each clamp structure will be described by reference to parts given the same numbering. Each is at a side edge of the shelf member and each has the form of a contoured band of material extending laterally outward from the flange 131. Each is at a side edge of the shelf members and each has an upward slope section 132 extending from the lateral ends of flange 131. This slope section creates a spacing of that portion of the clamp structure from the surface of the platform 52. The upward slope 132 continues until a peak 133 for it is reached, following which the band of the clamp structure turns downwardly to form a downward link or stretch 134 (see FIG. 19 for this detail). The downward portion 134 then curves or bends inwardly to form a return in the nature of an underside clamp section or lock flange 135. Return flange 135 is substantially parallel with the platform member and particularly the underside of the platform member. A lock edge 136 is formed at the side edge of the lock flange 135 nearest the lower-most edge 56 of the platform 52. Lock edge 136 in the illustrated embodiment also can be noted to be on the lower side edge of the clamp flange 135, or the side edge most remote from the upstanding shelf 130 of the assembly 127. Lock edge 136 is formed by reducing the thickness of the return underside portion 135 at its lower edge, as by a cut away of material from the lowermost portion of flange 135 at the side edge of it carrying lock edge projection 136.

The underside of each side edge 128 and 129 of the platform 52 carries depending stop members in the nature of stop hooks 141 and 142. These hooks project forwardly toward the upper edge of the platform. Stop hooks 141 and 142 are on opposite sides of the underside of the platform 52 and are directly across from each other. Each hook 141 and 142 is supported in spaced relationship from the undersurface of the platform by a depending support body or downward extension of material 143 and 144 along the underside lateral edges of the platform. Lock edges 136 at each side of the shelf assembly snugly fits into the recesses between the undersurface of the platform and hook projections 141 and 142; and the downwardly adjacent side edge of the thicker portion of the flanges 135 rests on the end portions of the stop hooks 135 to firmly hold the removable shelf assembly against downward sliding movement when it is added to the basic writing board. The shelf assembly is easily removed from the platform by sliding or pushing it upwardly so as to remove the opposing lateral lock edges 136 from the recess between the undersurface of the side edges of the platform and the stop hook projections 141 and 142, and then pressing downwardly on the slope surfaces 132 of the lateral clamp members as the shelf assembly is simply slid downwardly off the lower edge of the platform.

If desired, more than one pair of stop hooks may be spaced along the underside lateral edges of the platform, as, for example, stop hook 145 supported by support body 146 along the left edge 128 of the platform.

Optionally, a support strip or rib or ridge 148 may extend as an edge reinforcement along the underside of the lateral edges of the platform.

Still other shelf assemblies may be employed in the practice of the invention. However a very significant feature of shelf structures and means for incorporating them as an optional part of the writing board of the invention is that the surface of the platform member on which writing is to be accomplished in using the teachings of the invention should not contain any holes which would interfere with continuous pen or pencil movement for writing purposes on a piece of paper placed on the upper surface of the platform 52. Holes through a platform for adjustability of anything associated with the structure of the invention could contribute to document damage, as by poking a hole through documents placed on the surface of the platform while writing on them.

Refer now to FIGS. 8, 9, 12 and 13 (particularly FIGS. 12 and 13) for a discussion of the preferred clip member for the most preferred embodiments of the invention. A clip of the type illustrated is useful not only to hold paper on the platform for writing purposes but also to hold pencils or pens or calling cards. Spring means in the nature of a bent leaf spring 112 releasably biases the lower edge 114 of the clip plate 104 against the writing surface of the platform 52. A flanged or ear element 106 and 107 depends from each side edge of the clip member 104. Each flanged element 106 and 107 carries an interiorly extending stub 110 and 111 which is pivotally mated in a stub receiving recess 102 and 103 on the mounting posts 100 and 101 united to the platform member 52. The mounting posts 100 and 101 are ideally molded as an integral part of the platform member. The pivoting action of the clip member 104 at the mounting posts 100 allows paper to be inserted and removed from under the lower edge 114 of the clip member 104.

The leaf spring 112 suitably is constructed of a thin flat band of plain carbon spring steel, and is the only element which preferably is formed from material other than an organic plastics material (such as polystyrene or any other suitable organic plastic). The ideal length and width of the leaf spring 112 is approximately 2.5 centimeters or 1 inch by about 6.5 centimeters or two and one-half inches. The leaf spring 112 is bent back on itself in the lengthwise direction and inserted between the clip member 104 and the platform member 52 such that the legs of the leaf spring 112 form a "V" as shown in FIG. 9. One leg end of the clip abuts against a depending ridge on flange 113 at the upper end of the clip plate 104 and the other leg end rests on the platform 52. A platform guideway for the leaf spring 112, shown in FIG. 13, is formed integrally with the molding of the platform and suitably consists of laterally spaced spring guide ridges 115 and 116 and an end abutment guide ridge 117. The parallel side edges 115 and 116 of the guideway ideally measure approximately 2 centimeters or ¾ inches long and are united with the end abutment edge 119 at the right angle. The leaf spring and guideway relationship is such that the spring fits rather compactly within the guideway.

United integrally to the upper surface of the clip member 104, as particularly shown in FIGS. 9 and 12, are spaced card holding hooked elements 122 and 123 for receiving a business card or credit card. These hooked elements 121 and 122 are just sufficiently spaced upwardly from pen or pencil holding spaced hooks 124 and 125 to permit the pen or pencil to be snapped or pressed between the bottom edge of the projecting card hooks 122 and 123 into the recess of the pen hooks 124 and 125.

Figure 14:
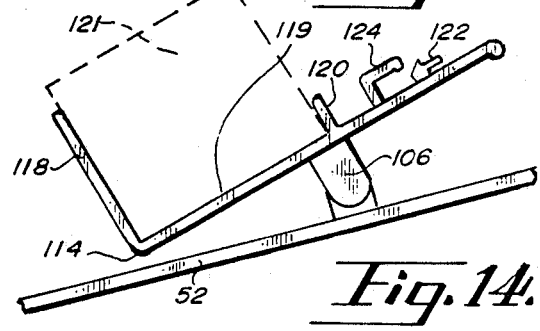
FIG. 14 is a schematic side view of an alternative clip member embodiment of the invention (here shown with the clip lower edge- slightly elevated above the platform surface)

An alternative clip member embodiment, shown in FIG. 14, has a lower shelf 118 projecting perpendicularly upwardly from the bottom edge 114 of a flat plate portion 119 of the clip plate 104. An upper narrow shelf 120 may likewise be employed. A clip having a shelf arrangement as illustrated may be useful to hold equipment such as a small computer or calculating device on the composite clip board at the clip member location while simultaneously permitting full use of the platform 52 for writing. As illustrated in FIGS. 14, the clip plate of this modified form may include (at an upper location) pen hooks 124 and card holder hooks 122.

In all embodiments of the invention, the width or distance between the side edges of the platform are less than the length dimension of the platform. This is clearly a requirement for the simple reason that the curved upper edge and collar arrangement must not extend over so great an arc as to interfere with versatility for fitting on a wide variety of steering wheels of different diameter and rim thicknesses. Yet, for the convenience and ease of mounting, the teaching of one continuous collar across the curved upper edge, with parallel side edges symmetrical from the ends of the collar, is essential. It is far easier and faster to mount one continuous recess over a steering wheel than a plurality of clamps or recesses. One continuous recess is readily mountable when mounting is started at any point along the recess, usually at one end of it.

By observing some size parameters, especially ideal size parameters, the most preferred board of the invention effectively will approximately center itself on steering wheels even of varied diameter The larger diameter wheels have thin rims (e.g., about ⅝ inch) which penetrate deeply into the recess of the collar, thus causing the upper end of the board to be about even with the outside diameter of the steering wheel and the lower end to come quite close to the diametrically opposing portion of the wheel. Smaller diameter steering wheels, which generally are thicker at their rim portion (e.g., about 1 and ¼ inches) than the larger diameter wheels, do not lodge as far into the recess of the collar. The upper edge of the board projects out from the outer diameter of the wheel and the lower edge of the board is thus brought upward, with the result that the board again will be more or less centered on the wheel.

Illustrative more or less ideal size parameters for the most preferred board are a length of about 16 to 17 inches, a width of about 9 to 10 inches, an upper curvature (and skirt curvature) having a radius of curvature of about 8 to 9 inches, an angle of about 105° for the projection of the flange from the skirt, a recess opening into the collar of about 1 and ¼ or possibly 1 and ⅜ inches at the distal edge of the flange and tapering to about ¾ or about ⅝ inch adjacent the skirt interior, and a flange projection of about 1 and ¼ to about 1 and ¾ inches from the skirt. The skirt wall thickness as well as the platform thickness suitably is about ⅛ inch, which reduces heat sink problems in molding and yet provides the strength features required, especially when plastics such as polystyrene are employed.

The illustrated specific embodiments are to be taken as illustrative and not limitative of my invention, the principles of which are set forth in the appended claims.

That which is claimed is:

1. A portable writing board mountable for use on a steering wheel of a vehicle and also entirely stable for writing use when rested upon any flat surface, comprising a platform member having substantially parallel side edges, a lower edge, and a curved upper edge approximating the curvature of the outer diameter of a vehicle steering wheel, and a single continuous retaining collar depending from said curved upper edge and unified thereto, there being no other structure extending downwardly from said platform, the distance between said parallel side edges being less than the distance between said lower edge and said curved upper edge, said retaining collar consisting essentially of a depending skirt portion and a flange-like portion directed radially inwardly from the bottom edge of said skirt portion to thereby form a recess capable of accommodating the rim of a vehicle steering wheel, said depending retaining collar being further characterized by the fact that its most depending portions form a bottom surface which extends continuously along the entire curvature of said retaining collar, which bottom surface lies in an imaginary plane intersecting said platform at an axis line perpendicular to said side edges of said platform and located at the lowermost bottom edge of said platform, whereby said bottom surface of said retaining collar provides continuous contact for underlying stable support of the entire curved upper edge of said writing board when the same is used on a flat surface.

2. The board of claim 1 wherein said platform itself provides a flat upper surface for support of writing material.

3. The board of claim 1 wherein said platform member includes a compartment and wherein a cover over said compartment provides a flat top writing surface, said cover being hinged for pivotal opening to gain access to said compartment.

4. The board of claim 1 additionally comprising clip means for holding paper thereupon.

5. The board of claim 1 additionally comprising an organic plastics clip structure wherein an organic plastics member resiliently performs a spring function for retaining the clip in a closed position.

6. The board of claim 1 additionally comprising a grooved recess in its upper surface for receiving a physical object.

7. The board of claim 1 characterized by being molded as a unitary piece consisting of organic plastics material.

8. The board of claim 1 wherein said flange-like portion of said depending collar structure is formed of material sufficiently yieldable to be distendable for accommodating the rim of a steering wheel.

9. The combination of the rim of steering wheel of a vehicle and a portable writing board mounted thereon for writing use but quickly demountable therefrom for writing use apart from said steering wheel, said board comprising a platform member having substantially parallel side edges, a lower edge, and a curved upper edge approximating the curvature of the outer diameter of said steering wheel, and a single continuous retaining collar depending from said curved upper edge and unified thereto, there being no other structure extending downwardly from said platform, the distance between said parallel side edges being less than the distance between said lower edge and said curved upper edge, said retaining collar consisting essentially of a relatively rigid skirt portion and a flange-like portion which is less rigid than said skirt portion, said skirt portion being continuously depending from the entirety of said curved upper edge from one side edge to the other side edge of said platform, said flange-like portion being united to and extending along the entirety of said skirt portion between side edges of said platform and being directed radially inwardly from said skirt portion in a spaced relationship to the underside surface of said platform, and said steering wheel rim being lodged in a pinching manner between said flange-like portion and said underside of said platform.

10. The combination of the rim of a steering wheel of a vehicle and a portable writing board mounted thereon for writing use but quickly demountable therefrom for writing use apart from said steering wheel, said board comprising a platform member having substantially parallel side edges, a lower edge, a curved upper edge approximating the curvature of the outer diameter of said steering wheel, and a single continuous retaining collar depending from said curved upper edge and unified thereto, there being no other structure extending downwardly from said platform, the distance between said parallel side edges being less than the distance between said lower edge and said curved upper edge, said retaining collar consisting essentially of a depending skirt portion and a flange-like portion directed radially inwardly from the bottom edge of said skirt portion to thereby form a mounting recess occupied by a portion of said steering wheel rim, wherein said retaining collar is further characterized by the fact that its most depending portions form a bottom surface which extends continuously along the entire curvature of said retaining collar, which bottom surface lies in an imaginary plane intersecting said platform at an axis line perpendicular to said side edges of said platform and located at the lowermost bottom edge of said platform, whereby said bottom surface of said retaining collar provides continuous contact for underlying stable support of the entire curved upper edge of said writing board when the same is used on a flat surface.

11. The combination of the rim of a steering wheel of a vehicle and a portable writing board mounted thereon for writing use but quickly demountable therefrom for writing use apart from said steering wheel, said board comprising a platform member having substantially parallel side edges, a lower edge, and a curved upper edge approximating the curvature of the outer diameter of said steering wheel, and a single continuous retaining collar depending from said curved upper edge and unified thereto, there being no other structure extending downwardly from said platform, the distance between said parallel side edges being less than the distance between said lower edge and said curved upper edge, said retaining collar consisting essentially of a depending skirt portion and a flange-like portion directed radially inwardly from the bottom edge of said skirt portion to thereby form a mounting recess occupied by a portion of said steering wheel rim, wherein the thickness of said steering wheel rim is greater than the width of the space between the flange-like portion of said collar and the opposing under side of said platform, and wherein said platform and said collar are molded as a unitary piece consisting of organic plastics material, with said flange-like portion of said collar sufficiently yieldable to permit distension in receiving said steering wheel rim, whereby said steering wheel rim is gripped between said flange-like portion and said opposing under side of said platform.

12. A portable writing board mountable for use on a steering wheel of a vehicle and also useful for writing upon when rested upon a flat surface, comprising a flat platform member having side edges, a lower edge, and a curved upper edge approximating the curvature of the outer diameter of a vehicle steering wheel, and a retaining collar depending from said curved upper edge and unified thereto, said retaining collar consisting essentially of a rigid depending skirt portion and a flange-like portion, said skirt portion having a unified junction to said curved upper edge and a terminal bottom edge at its most depending portion, said flange-like portion being directed radially inward from said skirt portion and united to said skirt portion along an arc spaced intermediate between the bottom edge of said skirt portion and the junction of said skirt portion to said upper edge of said platform member, said flange-like portion being united to said skirt portion at a non-normal angle to form a tapering recess of gradually diminishing width capable of snugly accommodating in a pinching manner a variety of rim thicknesses for a vehicle steering wheel.

13. The board of claim 12 wherein said flange-like portion extends from said skirt portion to form a substantially arc-shaped distal edge approximating the arc of curvature of the curved upper edge of said platform, said distal edge of said flange-like portion being such as not to interfere with the placement of the most depending edge of said skirt portion an said lower edge of said platform in resting condition upon a flat surface for writing.

14. The board of claim 12 wherein said skirt portion depends from said platform member at a right angle at any given point along said curved upper edge of said platform member.

15. The board of claim 12 wherein the bottom edge of said skirt portion forms a bottom surface which extends continuously along the entire curvature of said skirt portion and lies in an imaginary plane intersecting said platform member at an axis line perpendicular to said side edges of said platform member and located at the lower edge of said platform member, whereby said bottom surface of said skirt portion provides continuous contact for underlying stable support of the entire curved upper edge of said writing board when said writing board is used on a flat surface.

16. The board of claim 12 additionally having a plurality of spaced shim-like members within said tapering recess and united to the interior recess side of either said platform member or said flange-like member to aid in forming a snug fit of the rim of a vehicle steering wheel between said flange-like portion and the bottom surface of said platform member.

17. The board of claim 12 wherein said platform member is additionally characterized by having substantially parallel side edges, and by having downward depending means united to the underside of each said side edge for cooperative relationship with elements of a removable shelf assembly for mounting said shelf assembly on said platform member.

18. The board of claim 17 additionally having a removable shelf assembly on said platform member, said shelf assembly comprising a shelf member extending in a lateral direction on top of the writing surface of said platform member between said side edges and projecting upwardly from the writing surface of said platform member, and means cooperative with said downward depending means for mounting said shelf member on said platform member.

19. The board of claim 18 wherein said downwardly depending means comprises stop means, and wherein said means for mounting said shelf member on said platform member comprises a clamping member at each side edge of said shelf member for releasably clamping said shelf assembly in a position along the length of said platform member against said stop means.

20. The board of claim 18 wherein said downwardly depending means comprises a stop hook member on each side edge of said platform member, and wherein said means for mounting said shelf member on said platform member comprises a clamp member at each side edge of said shelf member for releasably clamping said shelf assembly in a position along the length of said platform, each said clamp member having an edge structure lockable in a said stop hook member to hold said shelf assembly against downward sliding movement on said platform member.

21. The board of claim 19 wherein said shelf assembly includes a mounting flange united to said shelf member, said clamp members being united to and extending from the lateral ends of said mounting flange.

22. The board of claim 18 wherein said downwardly depending means comprises downwardly projecting stops, and said means for mounting said shelf member on said platform member comprises a clamp member united to each side edge of said shelf member for releasably clamping said shelf assembly in a position along the length of said platform member, the holding action of said clamp member being aided by abutment of said clamp member against one of said stops.

23. The board of claim 18 wherein said downwardly projecting means comprises guide ridges extending along the length direction of the said edges of said platform.

24. The board of claim 12 wherein said platform member is additionally characterized by having substantially parallel side edges, and by having guide ridges united to said side edges along the length direction thereof for cooperative relationship with elements of an adjustable shelf assembly for mounting said assembly on said platform member.

25. The board of claim 24 additionally having a
n adjustable shelf assembly on said platform member, said shelf assembly comprising a shelf member extending laterally across the writing surface of said platform member between said side edges and projecting upwardly from the writing surface of said platform member, and means for mounting said shelf member on said platform member cooperatively with said guide ridges so as to allow said shelf assembly to be shifted along the length of said platform member.

26. The board of claim 25 having projecting stops integrally united to said guide ridges, said means for mounting said shelf member on said platform member comprising a clamping member united to each side edge of said shelf member for releasably clamping said shelf assembly in a selected position along the length of said guide ridges, the holding action of said clamping member being aided by abutment of said clamping member against one of said stops.

27. The board of claim 25 wherein said means for mounting said shelf member on said platform member comprises a knobbed spindle member extending laterally out from each side edge of said shelf member, a pivotally mounted bracket on each said knobbed spindle and embracing a said guide ridge, and cam means on the edge of said shelf member most proximate to the writing surface of said platform member for releasably camming said shelf member against movement at a selected position along the length of said guide ridges.

28. The board of claim 12 additionally having a releasable clip member mounted on the upper surface of the platform member.

29. The board of claim 12 additionally including a pair of laterally-spaced mounting posts united to the writing surface of the platform member, each said mounting post having a stub receiving recess, a clip member having a flanged element depending from each side edge thereof and carrying an interiorly extending stub pivotally mated in a stub receiving post recess, and spring means for biasing the lower edge of said clip member against said platform member.

30. The board of claim 29 wherein said spring means comprises a leaf spring.

31. The board of claim 29 wherein said clip member additionally comprises a shelf projecting perpendicular therefrom for supporting a box-like device thereupon.

32. A portable writing board mountable for use on a steering wheel of a vehicle, comprising a platform member having parallel side, edges, a lower edge, and a curved upper edge approximating the curvature of the outer diameter of a vehicle steering wheel, a skirt member depending from said curved upper edge and unified thereto, said skirt member having a bottom edge, a flange member extending from said skirt member radially inward beneath said platform member and united to said skirt member along an arc spaced intermediate between said bottom edge and the union of said skirt member to said curved upper edge, and a clip member for holding paper on the upper surface of said platform.

33. The board of claim 32 additionally having structural means united to the underside of each side edge of said platform member for cooperative relationship with elements of a removable shelf assembly for mounting such assembly on said platform member, and a removable shelf assembly comprising a shelf member extending laterally across the writing surface of said platform member between said side edges and projecting upwardly from the writing surface of said platform member, said shelf assembly having means for fixing said shelf member on said platform member cooperatively with said structural means.

34. The board of claim 33 wherein said structural means comprises a stop hook member, and said means for fixing said shelf member on said platform member comprises a clamp member at each side edge of said shelf member for releasably clamping said shelf assembly in a position along the length of said platform member, each said clamp member having an edge lockable in a said stop hook member to hold said shelf assembly against downward movement on said platform member.

35. The board of claim 33 wherein said structural means comprises depending stop members, and said means for fixing said shelf member on said platform member comprises a clamp member united to each side edge of said shelf member for releasably clamping said shelf assembly in a position along the length of said platform member, the holding action of said clamp member being aided by abutment of said clamp member against one of said stops.

36. The board of claim 33 wherein said structural means comprise a guide ridge, and said means for mounting said shelf member on said platform member comprises a knobbed spindle member extending laterally out from each side edge of said shelf member, a pivotally mounted bracket on each said knobbed spindle and embracing a said guide ridge, and cam means on the edge of said shelf member most proximate to the writing surface of said platform member for releasably camming said shelf member against movement at a selected position along the length of said guide ridges.

37. A portable writing board mountable for use on a steering wheel of a vehicle and also stable for writing upon when rested upon a flat surface, comprising a platform member having substantially parallel side edges, a lower edge, and a curved upper edge approximating the curvature of the outer diameter of a vehicle steering wheel, the distance between said parallel side edges being less than the distance between said upper edge and said lower edge, a clip member for holding paper on the writing surface of said platform, and a retaining collar depending from said curved upper edge and unified thereto, said retaining collar consisting essentially of a rigid depending skirt portion and a flange-like portion united to said skirt portion along an arc spaced intermediate between the most depending edge of said skirt portion and the union of said skirt portion to said upper edge of said platform member, said flange-like portion being yieldingly resilient and united to said skirt portion to extend underneath said platform member at a non-normal angle from said skirt portion so as to form a tapering recess of gradually diminishing width capable of snugly accommodating in a pinching manner a variety of rim thicknesses for a vehicle steering wheel.

38. The board of claim 37 wherein said skirt portion is further characterized by the fact that said most depending edge of said skirt portion forms a bottom surface which extends continuously along the entire curvature of said skirt portion, which bottom surface lies in an imaginary plane intersecting said platform at an axis line perpendicular to said side edges of said platform and located at the lowermost bottom edge of said platform, whereby said bottom surface of said skirt portion provides continuous contact for underlying stable support of the entire curved upper edge of said writing board when said writing board is used on a flat surface.

39. A portable writing board mountable for writing use on a vehicle steering wheel but quickly demountable therefrom for writing use apart from the steering wheel, said board comprising a platform member having substantially parallel side edges, a lower edge, and a curved upper edge approximately the curvature of the outer diameter of a vehicle steering wheel, and a single continuous retaining collar depending from said curved upper edge and unified thereto for receiving the rim of a vehicle steering wheel, there being no other structure extending downwardly from said platform, the distance between said parallel side edges being less than the distance between said lower edge and said curved upper edge, said retaining collar consisting essentially of a relatively rigid skirt portion and a flange-like portion which is less rigid than said skirt portion, said skirt portion being united to and depending from the said curved upper edge from one side edge to the other side edge of said platform, said flange-like portion being united to and extending along said skirt portion between side edges of said platform and being directed radially inward from said skirt portion in a spaced relationship to the underside of said platform, said spaced relationship and the inward extent of said flange-like portion being such that a vehicle steering wheel rim is pinched between said flange-like portion and said underside of said platform when said board is mounted thereupon.

40. A portable writing board mountable for use on a steering wheel of a vehicle but quickly demountable therefrom for writing use apart from a steering wheel, comprising a flat platform member having substantially parallel side edges, a lower edge, and a curved upper edge approximating the curvature of the outer diameter of a vehicle steering wheel, and a retaining collar depending from said curved upper edge and unified thereto for receiving the rim of a vehicle steering wheel, the distance between said side edges being less than that between said lower edge and said curved upper edge, said retaining collar consisting essentially of a skirt portion and a flange-like portion, said skirt portion having a unified junction to said curved upper edge and depending downwardly therefrom, said flange-like portion being united to said skirt portion in spaced relationship from the underside of said platform and extending radially inward from said skirt portion in an angular relationship with respect to said skirt portion, said angular relationship being at least about 95 degrees up to about 110 degrees such that a tapering recess of gradually diminishing width is formed between said flange-like portion and the underside of said platform, said tapering recess being effective to receive and pinchingly hold a variety of rim thicknesses for a vehicle steering wheel even when said curved upper edge of said board does not approximate the curvature of the outer diameter of the steering wheel on which said board is mounted.

41. The board of claim 40 wherein said skirt portion depends from said platform member at a right angle at any given point along said curved upper edge of said platform member.

42. The board of claim 40 wherein said flange-like member is yieldably resilient.

43. The board of claim 40 additionally having a plurality of spaced shim-like members within said tapering recess and united to the interior recess side of either said platform member or said flange-like member.

44. The board of claim 40 wherein the flange-like member terminates at an inward distal edge spaced about one and one-fourth inches from the underside of said platform.

45. The board of claim 40 additionally having a shelf assembly on said platform member, said shelf assembly comprising a shelf member extending laterally across the writing surface of said platform member between said side edges and projecting upwardly from the writing surface of said platform member, and means for removably mounting said shelf assembly on said platform member.

46. The board of claim 44 wherein said shelf assembly includes a mounting flange united to said shelf member along the base thereof, and wherein said means for removably mounting said shelf assembly on said platform member comprises clamp members united to the ends of said mounting flange and adapted to clamp over the side edges of said platform member.

* * * * *

UNITED STATES PATENT AND TRADEMARK OFFICE
CERTIFICATE OF CORRECTION

PATENT NO. : 4,955,576
DATED : September 11, 1990
INVENTOR(S) : Michael K. Moberg It is certified that error appears in the above—identified patent and that said Letters Patent is hereby corrected as shown below:

In the Specification:

Col. 12, line 61, delete "1/2" and insert --1/8--, so that the language will read "about 1/8 inch"

Signed and Sealed this

Tenth Day of December, 1991

Attest:

HARRY F. MANBECK, JR.

Attesting Officer

Commissioner of Patents and Trademarks